(12) United States Patent
Gateman

(10) Patent No.: US 9,623,448 B2
(45) Date of Patent: Apr. 18, 2017

(54) APPARATUS AND METHODS FOR CLEANING AN OCEAN BOTTOM CABLE

(71) Applicant: MAGSEIS AS, Lysaker (NO)

(72) Inventor: Jan B. Gateman, Bekkestua (NO)

(73) Assignee: MAGSEIS AS, Lysaker (NO)

( * ) Notice: Subject to any disclaimer, the term of this patent is extended or adjusted under 35 U.S.C. 154(b) by 0 days.

(21) Appl. No.: 15/103,454

(22) PCT Filed: Nov. 27, 2014

(86) PCT No.: PCT/NO2014/050223
§ 371 (c)(1),
(2) Date: Jun. 10, 2016

(87) PCT Pub. No.: WO2015/088352
PCT Pub. Date: Jun. 18, 2015

(65) Prior Publication Data
US 2016/0310996 A1    Oct. 27, 2016

(30) Foreign Application Priority Data
Dec. 11, 2013    (NO) .................................. 20131650

(51) Int. Cl.
*C23G 3/02*    (2006.01)
*B08B 3/02*    (2006.01)
(Continued)

(52) U.S. Cl.
CPC ................ *B08B 3/022* (2013.01); *B08B 3/10* (2013.01); *B08B 17/02* (2013.01); *G01V 1/38* (2013.01);
(Continued)

(58) Field of Classification Search
CPC ........... B08B 3/022; B08B 3/10; B08B 17/02; G01V 1/38; G01V 13/00; B63B 35/04; F16L 2101/12
(Continued)

(56) References Cited

U.S. PATENT DOCUMENTS 5,624,207 A    4/1997 Berges
2005/0052951 A1    3/2005 Ray
(Continued)

FOREIGN PATENT DOCUMENTS

WO    2009039252    3/2009
WO    2010025283    3/2010

OTHER PUBLICATIONS

International Search Report issued in PCT/NO2014/050223, Feb. 23, 2015, pp. 1-3.
(Continued)

*Primary Examiner* — Eric Golightly
(74) *Attorney, Agent, or Firm* — Jeffrey S. Melcher; Manelli Selter PLLC

(57) ABSTRACT

A cleaning apparatus (100) for an ocean bottom cable (19) including a plurality of node casings (5), each containing at least one sensor capsule (9). During retrieval, an initial flushing device flushes the assembled cable with seawater before the capsules (9) are separated from the casings (5) in a loading/unloading apparatus (300). A washing tunnel (110) is configured to flush the sensor capsule (9) with water supplied from a freshwater tank (115) through a waterfeed pipe (117). Preferably, the cleaning apparatus also comprises a secondary flushing device for flushing the components with seawater after separation, and a drying tunnel (120). Separate conveyors convey the sensor capsules (9) and the node casings (5) to their respective destinations, such that each component may be flushed in seawater and/or fresh-
(Continued)

water and/or dried as required. The cleaning apparatus is optimized to use a minimum of freshwater and energy.

18 Claims, 4 Drawing Sheets

(51) Int. Cl.
*G01V 1/38* (2006.01)
*G01V 13/00* (2006.01)
*B08B 3/10* (2006.01)
*B08B 17/02* (2006.01)
B63B 35/04 (2006.01)
F16L 101/12 (2006.01)

(52) U.S. Cl.
CPC .............. *G01V 13/00* (2013.01); *B63B 35/04* (2013.01); *F16L 2101/12* (2013.01)

(58) Field of Classification Search
USPC ..................................... 134/122 R
See application file for complete search history.

(56) References Cited

U.S. PATENT DOCUMENTS

| | | |
|---|---|---|
| 2006/0054186 A1 | 3/2006 | Lepage |
| 2009/0324338 A1 | 12/2009 | Thompson |
| 2011/0197919 A1 | 8/2011 | Tilley |
| 2012/0067368 A1 | 3/2012 | Toftner |
| 2013/0098394 A1 | 4/2013 | Fleischer-Pedersen |

OTHER PUBLICATIONS

Written Opinion issued in PCT/NO2014/050223, Feb. 23, 2015, pp. 1-7.

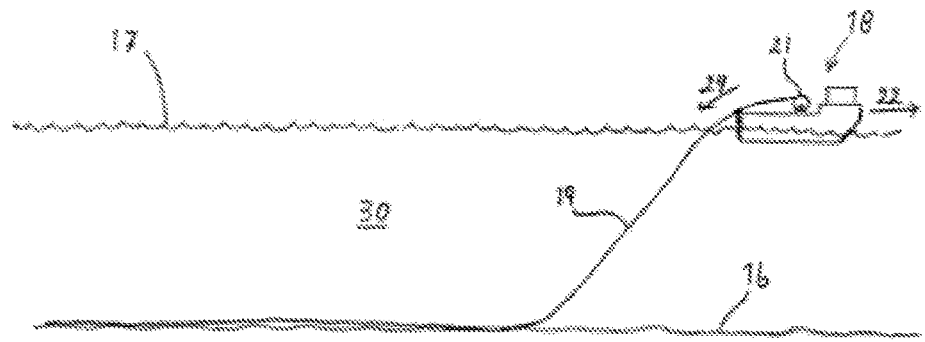
Fig. 1 [Prior Art]
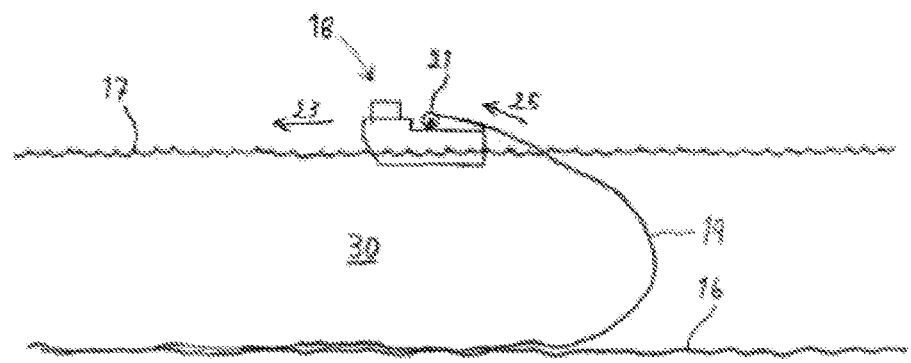
Fig. 2 [Prior Art]
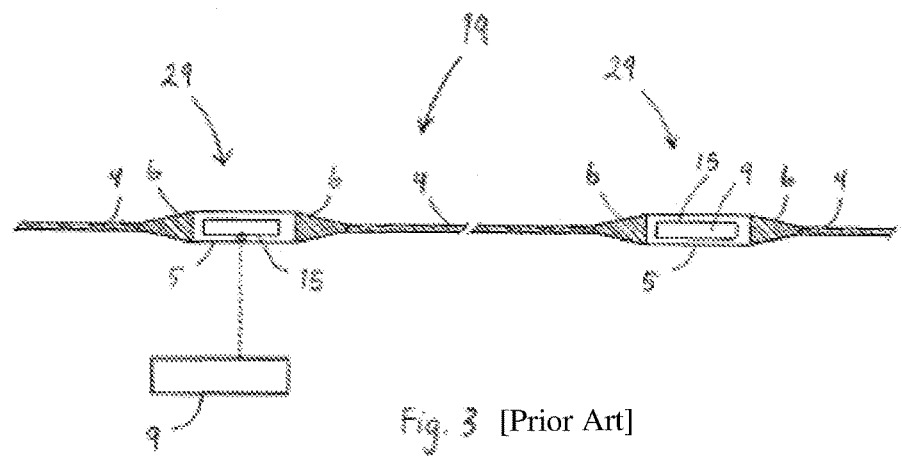
Fig. 3 [Prior Art]

APPARATUS AND METHODS FOR CLEANING AN OCEAN BOTTOM CABLE

BACKGROUND

Field of the Invention

The present invention relates to a marine seismic survey of an underground formation, in particular to an apparatus and method for cleaning an ocean bottom cable comprising seismic node casings and seismic sensor capsules.

Prior and Related Art

As used herein, a marine seismic survey is performed to map an underground formation below a body of water. In the following, the terms "sea" and "ocean" both refer to the body of water and "seafloor" and "ocean bottom" both refer to the interface between an underground formation and the body of water. No distinctions between "sea" and "ocean" should be inferred.

The marine seismic survey is performed by setting off an acoustic source in a series of shots at known positions. Echoes reflected or refracted by rock layers in the underground formation are recorded and analyzed to reveal the depths and elastic properties of the layers, for example in order to identify pockets of porous rock that may contain hydrocarbons before expensive drilling operations are performed.

The echoes may be detected by hydrophones towed behind a survey vessel or by seismic nodes on the seafloor. The latter method provides more information at a higher price, as the seismic nodes contain geophones that detect shear waves (S-waves) in addition to the pressure waves (P-waves) detected by the hydrophones. However, lower prices and increased performance of sensors, electronics and batteries make seismic nodes at the seafloor an ever more affordable alternative to the streamers, especially when the added information provided by the seismic sensors is considered.

An SSR or node may be connected to a cable commonly known as an Ocean Bottom Cable (OBC). The OBC may comprise a data communication line for real time transmission of data to the survey vessel. Alternatively, the OBC may comprise a simple wire or rope provided mainly to facilitate retrieval of the nodes. In this case, autonomous nodes record and store the information for later analysis. Lower prices and increased performance of data storage devices have increased the use of autonomous nodes or Seafloor Seismic Recorders (SSRs) that remain on the seafloor during a the series of shots.

FIG. 1 illustrates deployment of an OBC 19. In particular, a survey vessel 18 on a sea surface 17 moves in a direction 22. A storage reel 21 on the vessel 18 pays out the OBC 19 in the direction indicated by arrow 24 into the sea 30. Once deployed on the ocean bottom 16, the OBC 19 records the echoes from the rock layers in the subterranean formation.

FIG. 2 illustrates retrieval of the OBC 19. It is noted that the vessel 18 moves on the surface 17 in a direction 23 over the OBC 19 such that the nodes are pulled in a substantially vertical direction from the ocean bottom 16, i.e. such that the horizontal forces acting on the nodes (not shown) are minimized. For example, U.S. Pat. No. 6,082,710 (Odim, 1996) col. 2 line 19 states: "Moreover, the cable must run straight up from the ocean bottom, so that there is no tension in any direction along the ocean bottom, as this could cause the cable to become caught on objects on the bottom". The patent discloses a technique to attain this aim.

Fishing with a longline involves deployment (line setting) and retrieval (hauling) of a line or cable at sea. For example, U.S. Pat. No. 4,920,680 issued May 1, 1990 discloses an apparatus for line setting that includes various rollers and a drive circuit to control the tension in the longline. The document also describes coupling and decoupling ganglions and buoy lines to the longline. Thus, the skilled person searching for solutions in the present field is well advised to search prior art in the field of fishing with longlines for comparable solutions to problems on the present field of technology.

U.S. Pat. No. 5,624,207 A discloses a pulling arrangement for an ocean bottom cable in which friction between the OBC and a series of underinflated tyres is utilized to retrieve the OBC from a seafloor. Other relevant prior art documents are U.S. Pat. No. 5,655,753, in particular FIGS. 3 and 4, and U.S. Pat. No. 5,488,920. For simplicity, numerous details known from the above documents and references cited therein are omitted from FIG. 2, which merely shows the OBC 19 being reeled up in the direction 25 to the reel 21.

WO2010025283 discloses a system for handling a seismic cable with attachable and detachable nodes. The document describes a work station where nodes are attached manually and mentions that the operations may be automated. However, no specifications are given for the automation.

A modern OBC 19 may be up to 20 km long and comprise a node every 25 or 50 meters along its length. Cables are typically deployed 300-21 meters apart to form an array recording the echoes from shots fired at predetermined spots over the array. In order to store the required amount of cables, and to handle the number of nodes involved efficiently, a cable comprising removable sensor capsules has been proposed. This cable is illustrated on FIG. 3 and will be explained below. Further, NO 20121418 A1 describes an apparatus and methods to load and unload sensor capsules automatically from node casings forming part of the cable.

U.S. Pat. No. 6,070,857 discloses use of conveyors for use in the field of the present invention. As for the type of conveyor, there are at least three types in common use: containers pulled by an endless chain or rope, conveying belts and conveyors comprising numerous rotating rollers disposed side by side. These and other types are considered well known to one skilled in the art, and will not be discussed in greater detail as such. However, it should be noted that conveyors wherein an object is attached to or detached from a line running at constant speed are known from the field of line setting and hauling mentioned above, and also from endless rope conveyors such as gondolas or skilifts. Thus, when searching for solutions to problems regarding attaching or detaching an object from a constantly running seismic cable, the field of rope conveyors in general and skilifts in particular may contain viable prior art solutions.

FIG. 3 illustrates a seismic cable 19 of a kind used in the present invention. The cable comprises autonomous seismic nodes 29 interconnected by stress elements 4, in this embodiment formed by a steel wire. Each seismic node 29 comprises a node casing 5 and a removable sensor capsule 9 located in an inner space 15 of the node casing. The left hand side of FIG. 3 shows the sensor capsule 9 outside the inner space 15, while the right side of FIG. 3 shows the sensor capsule 9 inside the inner space 15. Each sensor capsule may comprise one or more not illustrated geophones, hydrophones, accelerometers, processors for executing program code, clocks, memories, movement sensors, temperature sensors, input/output means, power supplies, e.g. batteries, internal communication means and other components necessary to measure, record and store seismic signals, and possibly also perform some initial signal processing before the data are stored. Acoustic decoupling arrangements 6 between the node casings 5 and the stress elements 4 stop or reduce propagation of acoustic signals and noise between the seismic nodes 29.

Before deployment, the node casings 5 are stored on one or more reels 21 as part of the seismic cable 19, and the sensor capsules 9 are stored in a suitable storage. The sensor capsules 9 are preferably loaded automatically into the node casings 5 on board the vessel 18 during deployment, e.g. by the loading/unloading apparatus disclosed in Norwegian patent application NO 20121418 A1.

During retrieval, the sensor capsules 9 are preferably unloaded automatically from the node casings 5, e.g. by the loading/unloading apparatus disclosed in NO 20121418 A1. Then the sensor capsules are brought to one or more service stations, where the recorded data are retrieved. The service station(s) may also be responsible for replacing or recharging batteries, reprogramming of processors, synchronizing and recalibrating clocks and other tasks during retrieval and/or immediately before redeployment.

In order to handle a large number of nodes efficiently and to protect the service station(s), the sensor capsules should preferably be clean, free from salt and dry when they are put into the station after retrieval of the cable 19. Similarly, the other parts of the cable 19, e.g. the steel wire 4 and flexible node casings 5 should be reasonably clean, possibly free from salt or even dry to avoid corrosion and unpleasant odors when the cable is stored on the reel 21.

In principle, an OBC and/or SSRs may be deployed in shallow waters and be subject to fouling, i.e. growth of barnacles, weed and/or other marine organisms. Fouling may be removed by passing the cable through a ring shaped flushing tool suspended outside the vessel. This tool uses pressurized seawater to flush any fouling into the sea before the cable enters the vessel. "Fjerning av marin begroing" ("Removal of marine fouling") by Gloppen et. al, HSH, 2009 provides an overview of techniques and discloses a ring shaped flushing tool using pressurized seawater for removing marine fouling. Of course, such a flushing tool could also be employed to flush sand, clay and grit back into the sea.

It is understood that fouling is not a great concern at the depths and times involved in a typical survey as discussed herein, mainly because light does not penetrate to the depths of concern. When a node travels through a hundred meters or more of water between the seafloor and the vessel during retrieval, most particles, e.g. sand and grit, on the surface of a node casing fall off. However, particles lodged around the sensor capsule within the node casing may still be present at the surface during retrieval.

A first objective of the present invention is to provide an apparatus and a method to ensure that the components of the ocean bottom cable are reasonably clean, and sufficiently free from salt and dry when it is reeled up on a reel during retrieval. A second objective is to achieve the above objective in a cost efficient and environmentally sound manner.

SUMMARY OF THE INVENTION

The objectives above are met by a cleaning apparatus according to claim 1 and a method according to claim 17.

A first aspect of the invention concerns a cleaning apparatus for an ocean bottom cable including a plurality of node casings interconnected by stress elements. The cleaning apparatus comprises an initial flushing device configured to flush the ocean bottom cable with seawater; a loading/unloading apparatus disposed downstream from the initial flushing device, wherein the loading/unloading apparatus is configured to unload a sensor capsule from a node casing during retrieval of the ocean bottom cable to a seismic survey vessel; a washing tunnel disposed downstream from the loading/unloading apparatus, wherein the washing tunnel is configured to flush the sensor capsule with water supplied from a freshwater tank through a waterfeed pipe and water nozzles; first conveyor means configured to convey the sensor capsule from the unloading apparatus to a service station during said retrieval and in the opposite direction during a deployment; and second conveyor means configured to convey the stress elements and node casings from the loading/unloading apparatus to a storage reel during said retrieval and in the opposite direction during the deployment.

During retrieval, the node casings containing the sensor capsules are first flushed with seawater by the initial flushing device. Thus, most remaining sand, clay, grit, fouling, etc. is removed, preferably directly back into the sea, with a minimal consumption of freshwater.

The loading/unloading apparatus unloads a sensor capsule from a node casing during retrieval and loads a sensor capsule into a node casing during deployment of an OBC from a seismic survey vessel. During retrieval, a washing tunnel disposed downstream from the loading/unloading apparatus allows at least the sensor capsules to be flushed with water from a freshwater tank to remove all or most of the salty seawater. The node casing and stress member of the OBC may optionally also be desalinated in the washing tunnel. If some components of the OBC do not require desalination, this feature saves water from the freshwater tank.

During retrieval, first conveyor means convey the sensor capsules to a service station and separate second conveyor means convey the stress elements and node casings to a storage reel. This feature allows the sensor capsules and node casings to travel along different paths through the cleaning apparatus. For example, the sensor capsules may pass through the washing tunnel regardless of whether the node casings pass through the washing tunnel or not. Also, the sensor capsules may pass by or not pass by a secondary seawater nozzle independently of whether the stress member and empty node casing r pass by the secondary seawater nozzle. Similarly, the sensor casings may pass or not pass through a drying tunnel independently of whether the remainder of the OBC passes through the drying tunnel or not. Thus, separate first and second conveyor means allows different components to be subjected to different treatments depending on their respective requirements. At the same time, any remaining particles and/or fouling is preferably removed from the different parts of the OBC, in particular the recess of the casing previously blocked by the sensor capsule, by flushing with either seawater or freshwater.

During retrieval, the capsules are unloaded from the node casings and conveyed to the service station, whereas the casings are conveyed to the storage reel. During deployment, both are conveyed in the opposite direction and the sensor capsules are loaded into the node casings. During deployment, the cleaning apparatus may serve a slightly different purpose, e.g. wetting the components to facilitate insertion of the sensor capsules into the node casings. For example, wetting the surfaces of a sensor capsule and a recess of a rubber casing would decrease the friction and facilitate insertion of the capsule into the casing.

The conveyor means may comprise any conveyor known in the art. These include, but are not limited to, endless belts, wire conveyors, sliding planes and rollers. For example, the sensor capsules may be carried on a conveyor belt or a cassette pulled along rails by an endless chain with hooks engaging the cassette. Independently of the capsule conveyors, the stress members and casings can be guided through the cleaning apparatus according to the invention by active or passive pulleys, rollers etc. to or from the storage reel.

Some embodiments comprise a stacking device configured to stack the sensor capsules in a rectangular cassette with the longitudinal axes of the sensor capsules perpendicular to the rectangular plane spanned by the sides of the cassette. When the sensor capsules are orderly stacked at a distance from each other, all their surfaces are readily available for flushing and/or drying.

The stacking device may be, for example, a general purpose industrial robot or a specialized automat comprising an electronic controller, electro-, pneumatic or hydraulic motors and associated transmissions. However, the stacking device is preferably a mechanical device in order to save energy and cost of manufacture. In general, the stacking device is similar to those used for stacking bottles in a case at a bottling plant, which are known as such. The longitudinal axes of the sensor capsules are preferably oriented vertically and perpendicular to a horizontal bottom of the cassette. However, the sensor capsules may be oriented horizontally if desirous.

In some embodiments, the stacking device is arranged between the loading/unloading apparatus and the washing tunnel. In these embodiments, the cassette preferably has a horizontal bottom with holes or opening through which water and drying gas may escape.

Some embodiments comprise a drain pipe extending from the bottom of the washing tank to a discharge pipe extending to a region outboard of the seismic survey vessel. The drain pipe and discharge pipe are connected such that wastewater from the washing tunnel may be discharged to the sea rather than being discharged on the deck of the vessel.

Wastewater that is not too salty may also be recycled. Thus, some embodiments comprise a supply pipe extending from the drain pipe to the waterfeed pipe comprising the water nozzles and a control module configured to operate valves to discharge wastewater through the discharge pipe and replace the discharged wastewater with freshwater from the freshwater tank whenever the salinity in the wastewater in the drain pipe exceeds a predetermined threshold value.

Disposing a salinity sensor at the outlet from the washing tunnel and providing the required logic and actuators, i.e. motors with associated transmissions, to replace a predetermined amount of salty wastewater with freshwater are considered within the skills of one having ordinary skill in the art.

Some embodiments comprise a water heater on the waterfeed pipe. In principle, the water heater might comprise an evaporator and a condenser to desalinate waste water for reuse. However, the energy required to evaporate water is likely to be excessive in many applications. Thus, the main purpose of the water heater is to heat the flushing water just enough to ensure that the water is evaporated from the sensor capsule before it is inserted into a service station (not shown).

The water heater may comprise a heat exchanger configured to convey heat from wastewater to the water supplied to the water nozzles. It is left to the skilled person to determine whether investment and operational costs for a heat exchanger outweighs the cost of simply discharging warm wastewater and heating freshwater.

The cleaning apparatus may further comprise a gas heater on a gasfeed pipe comprising the gas nozzles, and the gas heater may comprise a heat exchanger configured to convey heat from wastewater to the gas supplied to the gas nozzles.

Providing separate heat exchangers for flushing water and drying gas is likely to be more expensive than necessary. Rather, if a heat exchanger for pulling heat from the waste water is found economically viable, it may be possible to pass an extra supply line through the hot side of the exchanger for a small extra expense, such that both water and gas are heated.

In a second aspect, the invention provides a method for cleaning an ocean bottom cable including a plurality of node casings interconnected by stress elements, each node casing comprising at least one sensor capsule. The method comprises the step of conveying the sensor capsule and the ocean bottom cable through a cleaning apparatus according to the first aspect, either both in the downstream direction or both in an opposite direction. Thus, the apparatus according to the first aspect can be used for cleaning during retrieval and wetting during deployment as discussed above.

The method may further comprise a step of applying an anti-fouling agent to the ocean bottom cable and/or the sensor capsules. As indicated above, this step may be relevant when surveying in shallow waters for an extending period of time.

Further benefits and features may appear in the following detailed description referencing the drawings and in the claims.

BRIEF DESCRIPTION OF THE DRAWINGS

The invention is further disclosed in the following detailed description with reference to the accompanying drawings, in which:

FIG. 1 (prior art) illustrates deployment of an ocean bottom seismic cable;

FIG. 2 (prior art) illustrates retrieval of an ocean bottom seismic cable;

FIG. 3 (prior art) illustrates a cable with removable sensor capsules for use in the present invention;

DETAILED DESCRIPTION OF A PREFERRED EMBODIMENT

The drawings are schematic and intended to illustrate the principles of the invention. Thus, they are not necessarily to scale, and numerous details known to one skilled in the art are omitted from the drawings and the following description for clarity.

FIGS. 1-3 illustrate the context of the present invention, and are described above.

Figure 4:
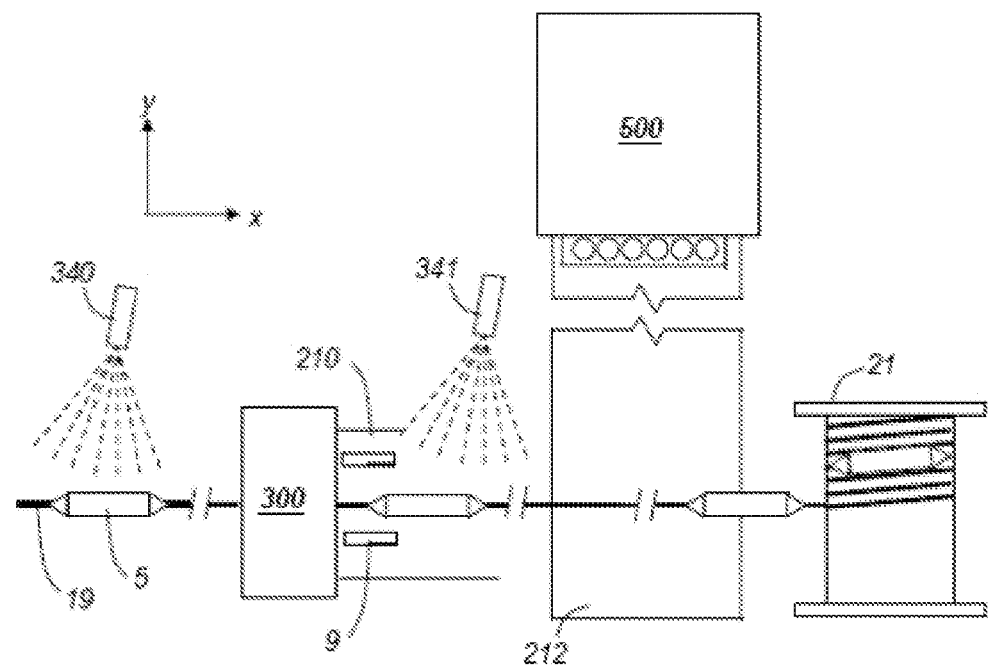
FIG. 4 shows an apparatus according to the invention viewed from above.

FIG. 4 is a schematic view of an apparatus for cleaning an OBC 19. During retrieval, an incoming node casing 5 containing one or more sensor capsules 9 is flushed by salt water, illustrated by nozzle 340. This initial flush removes sand and grit, and can be performed outside the vessel if desired. After initial flushing, the OBC 19 enters the loading/unloading apparatus 300, wherein sensor capsules 9 are unloaded from the node casings 5. In the present example, each node casing 5 contains two sensor capsules 9. However, in an alternative embodiment, each node casing 5 contains one sensor capsule 9 accessible through an opening facing either right or left during retrieval. While grippers in the illustrated example pulls one capsule 9 from each side of the casing 5, only the gripper at the side of the opening pulls out a capsule 9 in the alternative embodiment. The sensor capsules 9 and/or empty node casings 5 are preferably cleaned a second time before storage. In FIG. 4, this is illustrated by nozzle 341. If a washing tunnel of a type described below is provided, a path comprising the nozzle 341 may be provided outside the washing tunnel. That is, an OBC can, for a shorter or longer period of time, be guided outside the washing tunnel described below, and still be flushed with seawater from nozzle 341. In particular, the capsules 9 may be conveyed through a washing tunnel for rinsing in freshwater and possibly drying, whereas the OBC 19 with empty node casings 5 may be guided outside the washing tunnel and possibly be flushed with salt water by nozzle 341.

The sensor capsules 9 and the remainder of the OBC, i.e. the stress members 4 and node casings 5, generally have different requirements for cleaning. For example, sensor capsules 9 of stainless steel would preferably be rinsed in freshwater and dried before they are inserted into a service station 500 comprising connectors and electronics for downloading seismic data, whereas the rest of the OBC might simply be flushed with seawater from nozzle 341 before storage on reel 21 in order to save freshwater for flushing and energy for drying. To accommodate the different needs, separate conveyor means are provided for the different components. First conveyor means convey the sensor capsules 9 to or from the service station 500, and second conveyor means, independent from the first conveyor means, convey the node casings 5 to or from the storage reel 21. In FIG. 4, the conveyor means are generally represented by conveyor belts 210 and 212. However, any alternatives known in the art may be employed for the first and second conveyor means, e.g. a belt for the capsules 9 and pulleys for the OBC 19.

In a preferred embodiment, the sensor capsules 9 are inserted into a cassette 220, rinsed and dried before insertion into the service station 500. Conveyors 210 and 212 represent the first and second conveyor means, and thus convey the capsules 9 and the other components to their different destinations. Of course, belts, rollers etc. can be used to convey the various components to their desired destinations. In FIG. 4, this is illustrated in that OBC 19 moves in the x-direction only, whereas the capsules 9 move partly in the x-direction and partly in the y-direction.

During deployment, sensor capsules 9 are fetched from the service station 500 and loaded into the casings 5, which form part of the OBC 19. For convenience, the following examples assume retrieval of the OBC 19 from the sea. However, it is understood that similar examples might be provided for deployment of the OBC. Furthermore, the x, y and z directions are mutually perpendicular and common to all drawings herein.

Figure 5:
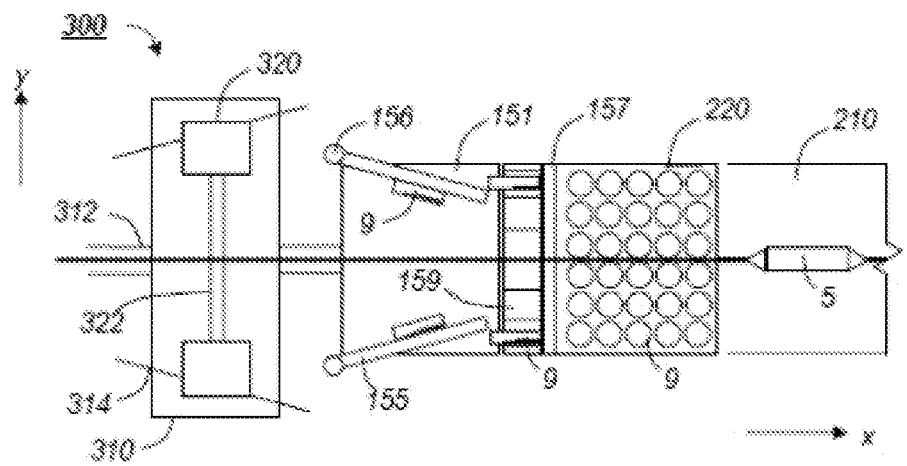
FIG. 5 shows a first embodiment viewed from above.

FIG. 5 shows a stacking device viewed from above. The loading/-unloading apparatus 300 from NO 20121418 A1 is schematically depicted on the left hand side of FIG. 5, and comprises a trolley 310 that runs back and forth on a longitudinal guide 312 along the cable 19, i.e. in the x-direction. Loading and unloading means 320 are disposed on the trolley 310 and are movable along a transverse guide 322, i.e. in the direction denoted by y. The loading and unloading means 320 are also attached to a guide 314 that is inclined relative to the longitudinal guide 312, such that the loading and unloading device 320 approaches the cable 19 as the trolley 310 moves away from the apparatus 100. During retrieval of the cable 19, the trolley 310 hooks onto a seismic node casing 5 at a position to the left of FIG. 5, wherein the loading and unloading means 320 are adjacent to the sensor capsules 9. In this position, the unloading means 320 grip the sensor capsule 9. As the trolley 310 moves in the x-direction, the guides 314 and 322 cause the unloading means 320 to pull the sensor capsule 9 out from the node casing 5. Not illustrated guides are provided to orient the node casing 5 such that the sensor capsule 9 faces the unloading means 320 when the trolley 310 attaches to the node casing 5 during retrieval.

In FIG. 5, two unloading means 320 are arranged symmetrically about the OBC 19 and have deposited two sensor capsules 9. As indicated above, the symmetrically arranged unloading means 320 may alternatively accommodate a casing 5 comprising one capsule 9 that may be accessible from either one side or the other side but not both sides. In either case, a capsule slides down an inclined plane 151 until it is stopped at the bottom by stopper 157.

In the present example with two capsules 9 per casing 5, each capsule 9 slides along one of two symmetrically arranged guides 155. The trolley 310 is a small distance from the plane 151 to illustrate that it may return for a new pair of sensor capsules 9 while the previous pair is still sliding along the guides 155. Each guide 155 may pivot about an axis 156 that is perpendicular to plane 151 and located at the upper end of the guide 155. Thus, a sensor capsule 9 sliding along the guide 155 will slide into a particular slot 159 depending on the pivot angle between an edge of plane 151 and the guide 155. One previous pair of sensor capsules 9 is shown in the slots 159 closest to the lateral edges, and the two capsules sliding along guides 155 are destined for the slots one step away from the edges. There is one slot 159 for each slot in a row of the cassette 220, for example three pairs of capsules 9 and six corresponding slots as in FIG. 5.

The trolley 310 moves back and forth in the x-direction, and may thus conveniently be used to put the sensor capsules 9 into cassette 220 without the need for a further linear motor. For example, the arriving trolley 310 may engage a lever advancing the guides 151 to the next position. When the last pair of slots 159, e.g. the slots closest to the OBC, are occupied by sensor capsules 9, a release mechanism (not shown) may be triggered, e.g. by the weight of the last two sensor capsules. The release mechanism causes the slots to pivot such that the full row of capsules 9 passes under the stopper 157 and slide into corresponding seats in the cassette 220. Also, the release mechanism returns the guides 155 to their initial positions and advances the cassette 220 one row, such that the device is ready for collecting a new row of sensor capsules 9.

It is understood that gravity conveys the capsules 9 down the inclined plane 151 on FIG. 5, i.e. in the x-direction. FIG. 4 illustrates a cassette 220 being moved in the y-direction on a belt 212. Of course, the cassette might be carried by roller, rails etc. Thus, a variety of conveyors may be employed in different parts of the invention. The conveyors as such are not part of the invention. Hence, in the following, the conveyor 210 is depicted as a conveyor belt for illustrative purposes. However, an endless chain, rollers or any other known conveyor capable of conveying the sensor capsules 9 through a washing tunnel 110 and a drying tunnel 120 may be used with the invention.

The sensor capsules 9 are separated from the node casing 5 before or immediately after they enter the washing tunnel 110 and should preferably be clean, free from salt and dry as they enter the service station 500 (FIG. 4) for unloading seismic data, recharging batteries and other tasks requiring electrical connections to the sensor capsules. As the stress element 4, the node casing 5 and other components of the cable 19 discussed with reference to FIG. 3 are separated from the sensor capsules, their flushing and drying is optional and depending on the composition of the cable 19. For example, some embodiments might neither require flushing in freshwater nor drying. For such embodiments, the cable 19 would not need to pass through the washing tunnel 110 nor through the drying tunnel 120, but might be wound directly onto reel 21, possibly after an additional flush by salt water by nozzle 341 as discussed with reference to FIG. 4. Another embodiment of the cable 19 might benefit from being flushed with freshwater, but not require drying. In yet another embodiment, salt may not be a concern, but drying the cable before it is reeled up and stored may still be advantageous. Finally, some embodiments might benefit from both flushing and drying. Thus, while the sensor capsules 9 pass through the washing tunnel 110 and the drying tunnel 120, the remainder of the cable 19 is optionally conveyed through the washing tunnel 110 and/or through the drying tunnel 120 depending on its design. Means for conveying the cable 19 through a tunnel or around a tunnel are known in the art, and hence not described in detail herein.

Figure 6:
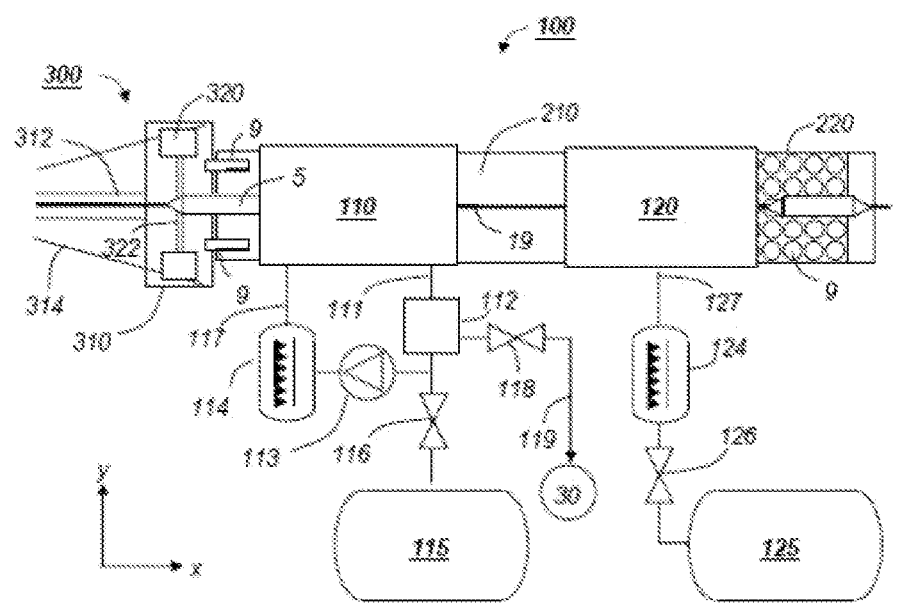
FIG. 6 shows a second embodiment viewed from above.
Figure 7:
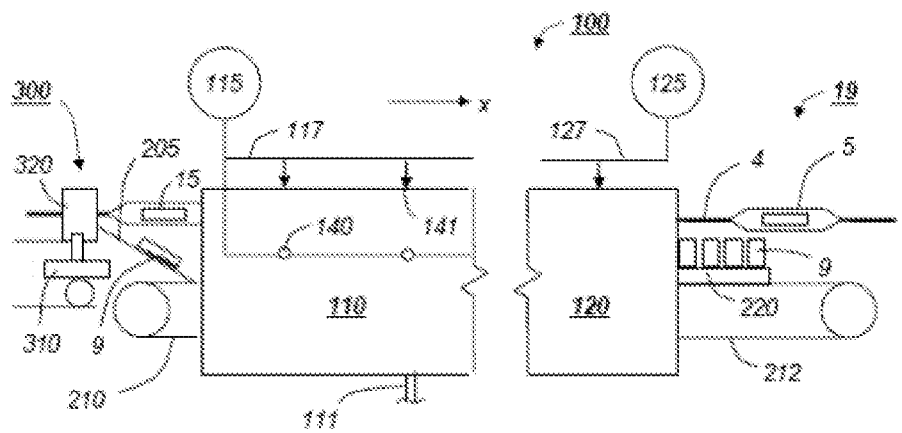
FIG. 7 shows part of the apparatus in FIG. 6 viewed from a side.

In the embodiment on FIG. 6, all surfaces of the sensor capsules 9, the stress element 4 and the node capsule 5 including recess 15 (FIG. 3) are exposed to freshwater in the washing tunnel 110. The freshwater is supplied from a freshwater tank 115 through a valve 116 and a waterfeed pipe 117. The waterfeed pipe 117 preferably comprises a plurality of nozzles within the washing tunnel 110 as will be further explained with reference to FIG. 8. A pump 113 is shown to illustrate the need for providing circulation. Other pumps are not shown for the sake of simplicity, but would be present in a practical implementation in a manner known to one skilled in the art, for example to provide a desired pressure drop over the nozzles 140, 141 (FIG. 7).

Preferably, the water is heated in a water heater 114 before it enters the washing tunnel. The water heater 114 may, for example, comprise an electrical heating element and/or a heat exchanger. The purpose of heating the freshwater is to increase evaporation and thus shorten the time to dry. Thus, the length of a subsequent drying tunnel 120, heat provided in the drying tunnel 120 or the time required for drying the sensor capsules 9 may be decreased at the expense of space and energy for the water heater 114.

After flushing in the washing tunnel 110, the conveyor 210 conveys components that are wet and free from salt water to the drying tunnel 120. While the drying tunnel 120 is shown as a separate unit, it may be disposed adjacent to the washing tunnel 110. The drying is performed by gas, e.g. air or nitrogen, from an accumulator 125. The pressure in accumulator 125 is decreased to a desired pressure by a pressure regulator 126, preferably heated by a gas heater 124 and supplied to nozzles (not shown) within the drying tunnel 120 through a gasfeed pipe 127.

In a preferred embodiment, the waste water is collected in a pan under the washing tunnel 110 and let out through a drainpipe 111. A control unit 112 senses the salinity of the waste water. When the salinity exceeds a predetermined threshold, some of the wastewater is discharged to the sea 30 through a controlled valve 118 and a discharge pipe 119. The discharged wastewater is preferably replaced with freshwater from the freshwater tank 115. Thus, the consumption of freshwater and the consumption of energy to heat the water may be reduced.

While not shown on FIG. 6, the energy consumption may be further decreased by running the discharge pipe 119 through a heat exchanger in the water heater 114 before the wastewater is discharged into the sea 30. Alternatively, a separate heat exchanger could be provided on the discharge line such that heat is transferred from the waste water in the discharge pipe 119 to a suitable medium, e.g. water in a closed loop, which in turn might be used to heat or preheat the water used for flushing in the washing tunnel 110 and/or the drying gas supplied to the drying tunnel 120. Also, the wastewater in discharge pipe 119 might be desalinated and used to replenish the freshwater tank 115. It is left to the skilled person to design a viable solution based on performance requirements and the cost of installing and operating optional heat exchanger(s), evaporator, osmosis filter or other commercially available component.

From the above it should be understood that the water heater 114 and gas heater 124 shown on FIG. 6 are optional: The sensor capsules 9 might simply be left to dry for a longer period at a lower temperature. Furthermore, both heaters 114 and 124 may include an electrical heating element, and one or both of the heaters 114 and 124 may optionally include a heat exchanger using heat from the waste water in some form to heat or preheat the water used for flushing or the gas used for drying the sensor capsules.

On the right hand side of FIG. 4, the sensor capsules are shown in a cassette 220 exiting from the drying tunnel 120. By stacking the sensor capsules 9 at a distance from each other, e.g. with their longitudinal axes vertically as shown, all surfaces of all sensor capsules 9 are readily exposed for flushing in the washing tunnel 110 and/or drying gas in the drying tunnel 120. Of course, the cassette 220 on FIGS. 4 and 5 would have holes in the bottom such that water and drying gas will flow past each sensor capsule 9. Other arrangements, such as providing a vertical cassette 220 with horizontal sensor capsules 9, are anticipated. However, vertically oriented sensor capsules as shown is believed to be the more practical embodiment, as the sensor capsules are less likely to fall out from such a tray than from a shelf. Further, if a cassette 220 is provided, the sensor capsules might advantageously be stacked in the cassette 220 before they enter the washing tunnel 110, because the amount of water required for flushing is limited when all surfaces are guaranteed to be immediately exposed to the water within the washing tunnel. However, embodiments wherein the sensor capsules 9 are stacked in a cassette between the washing tunnel 110 and drying tunnel 120 may be considered for certain implementations.

A device used for stacking the sensor capsules in a cassette 220 is known as such, e.g. from the field of bottling equipment wherein similar devices are used to put bottles in a crate. Alternatively, a general purpose industrial robot could be programmed to put the sensor capsules 9 into the cassette 220 either before the washing tunnel 110 or in an area between the washing tunnel and the drying tunnel 120.

FIG. 7 shows parts of the apparatus 100 on FIG. 6 viewed from a side. The apparatus 300 from NO 20121418 A1 is illustrated in the same position as in FIG. 6, i.e. the trolley 310 is at its rightmost position in the x-direction on FIG. 7. Further, the unloading means 320 has pulled a sensor capsule 9 from the inner space 15 and dropped it on an inclined surface, such as the surface 151 discussed previously. In this embodiment, the sensor capsule 9 is assumed to slide down the inclined surface toward the conveyor 210, which in turn will convey the sensor capsule 9 in the x-direction. It is readily understood that the inclined surface at reference numeral 205 is just one example of a feeding device 205 configured to convey the sensor capsule 9 from the loading/unloading apparatus to a conveyor 210. Alternatively, an electromechanical, pneumatic and/or hydraulic device, including a general purpose industrial robot, might be used for the same purpose.

On FIG. 7, the cassette 220 with several sensor capsules is carried on a conveyor 212 which may be different from the conveyor 210. For example, the conveyor 210 may be a conveyor belt, and the conveyor 212 may be a chain with hooks engaging the cassette 220. In accordance with the description above, the reference numerals 210 and 212 can be one conveyor 210, e.g. if the sensor capsules are put into the cassette 220 before entry into the washing tunnel 110 or if the cassette is conveyed on a belt through the tunnels 110 and 120.

Figure 8:
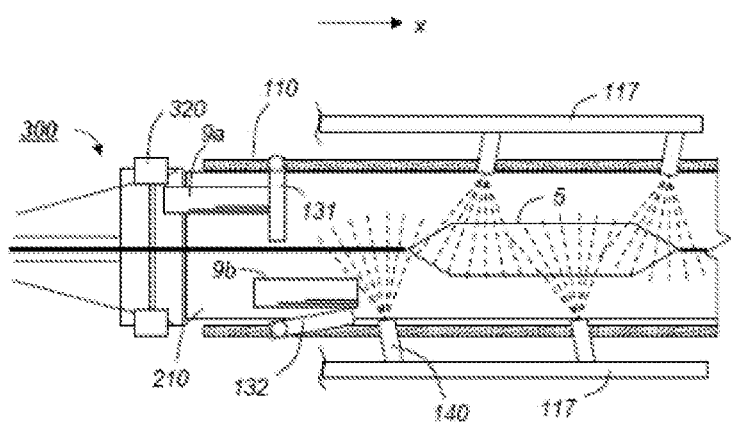
FIG. 8 is a section through part of an alternative embodiment according to the invention.

The cable 19, comprising a steel wire 4 and node casings 5, is oriented such that the inner spaces 15 are facing sideways, i.e. in the y-direction on FIG. 6 and into or out of the paper plane on FIG. 7. The FIG. 8 show the cable 19 stretched above the conveyor 210, 212 through the washing tunnel 110 and drying tunnel 120. Guides for achieving this are well known to the skilled person, and are not shown. The cable 19 may alternatively be conveyed by the conveyor(s) 210, 212.

The main purpose of washing tunnel 110 is to flush seawater or salt from the cable 19 and sensor capsules 9. To achieve this efficiently, a relatively large volume flow of freshwater from the freshwater tank 115 is through the waterfeed pipe 117 and a plurality of nozzles 140, 141 distributed over the washing tunnel 110. As illustrated on FIG. 7, some nozzles are disposed on top of the tunnel pointing downward and others flush the cable 19 and sensor capsules from the sides. The nozzles should be located such that every part of the cable 19 and sensor capsule 9 is flushed. Otherwise their exact locations are not important. Preferably, the water pressure from the nozzles is relatively low, for example below ten bars and typically at a few bars. As indicated above, a large amount of water in which to dissolve salt is beneficial. For this, there is no need for expensive high pressure pumps, plumbing or other equipment. Furthermore, even if the equipment is designed for high static pressures on a seafloor, sudden and large pressure drops in a high speed jet may cause undesired cavitation. Under certain circumstances, high pressure jets may also press particles into close contact with a surface such that they adhere firmly and are difficult to remove at a later time.

The wastewater exits through the drainpipe 111 at the bottom of the washing tunnel 110, and may be discharged directly overboard or recycled as discussed above.

Gas from the accumulator 125 enters the drying tunnel 120 through the gasfeed pipe 127. As the sensor capsules 9 are depicted in a vertical orientation in the cassette 220, an inlet for gas, e.g. hot air, is conveniently placed on top of the drying tunnel 120 such that the gas flows past sensor capsules 9 that are arranged parallel to and at a distance from each other.

It should be noted that the cable 19 is shown above the cassette 220 on FIG. 7 for illustrative purposes. However, in this arrangement the cable 19 would tend to drip on the sensor capsules and increase the time required to blow the sensor capsules dry. Thus, in a practical embodiment the cable 19 could be carried by the conveyor 210, 212 or routed entirely outside the drying tunnel 120 as discussed earlier.

FIG. 8 is a section through part of an alternative embodiment according to the invention. In the embodiment on FIG. 8, the node casing 5 is carried by the conveyor 210 and flushed by a plurality of nozzles 140 fed by the waterfeed pipe 117. Protrusions or guides (not shown) provided along the washing tunnel 110 may pivot the node casing 5 about its longitudinal axis such that the freshwater from the nozzles 140 flushes all surfaces, including the surface facing the conveyor 210 on FIG. 8.

Retaining gates 131, 132 are provided to displace the sensor capsules 9 longitudinally from the node casing 5 such that all surfaces of all components are flushed properly and efficiently. On FIG. 8, it is assumed that the loading/unloading apparatus 300 has unloaded two sensor capsules 9a and 9b simultaneously on the conveyor 210 on opposite sides of the cable. A first pivoted retaining gate 131 retains one sensor capsule 9a while the node casing 5 and the other sensor capsule 9b travels with the conveyor in the x-direction. A second pivoted retaining gate 132 has recently released the second sensor capsule 9b such that it travels behind the node casing 5 on the conveyor 210.

The nozzles 140 provide water jets in an overlapping pattern to ensure a good distribution of the fresh water on all relevant surfaces as discussed above.

Use of the above apparatus is straightforward: The sensor capsules are conveyed through the washing tunnel 110 and drying tunnel 120 by one or more conventional conveyors, whereby they exit from the drying tunnel in a state where they may be inserted into a service station without causing problems with electrical contacts or other equipment. The conveyors may include a cassette 220 for stacking the sensor capsules 9 at a distance from each other to ensure that water and/or drying gas may flow past all surfaces of all sensor capsules in a minimum of time.

A separate apparatus, e.g. using seawater for flushing, may be arranged outside the survey vessel to remove any particles or fouling if required. Thus, the apparatus of the present invention is assumed to receive a seismic cable 19 that is wet with saltwater and reasonably free from particles and fouling. Any remaining grit or fouling might be separated from the waste water exiting through the drain 111 by a suitable filter, and is not discussed in detail herein.

If desirous, an anti-fouling agent may be applied to the cable 19 and/or the sensor capsules 9 after washing and drying. This step can be performed during retrieval, preferably after the sensor capsules 9 are unloaded from the remainder of the cable 19, or during deployment, preferably before the sensor capsules 9 are loaded into the node casings 5.

While the invention has been described with reference to specific embodiments, the invention is determined by the subject matter set forth in the appended claims.

The invention claimed is:

1. A cleaning apparatus for an ocean bottom cable including a plurality of node casings interconnected by stress elements comprising:
   an initial flushing device configured to flush the ocean bottom cable with seawater;
   a loading/unloading apparatus disposed downstream from the initial flushing device, wherein the loading/unloading apparatus is configured to unload a sensor capsule from a node casing during retrieval of the ocean bottom cable to a seismic survey vessel;
   a washing tunnel disposed downstream from the loading/unloading apparatus, wherein the washing tunnel is configured to flush the sensor capsule with water supplied from a freshwater tank through a waterfeed pipe and water nozzles;

first conveyor means configured to convey the sensor capsule from the unloading apparatus to a service station during said retrieval and in an opposite direction during a deployment; and second conveyor means configured to convey the stress elements and node casings from the loading/unloading apparatus to a storage reel during said retrieval and in the opposite direction during the deployment.

2. The cleaning apparatus according to claim 1, wherein the first conveyor means are disposed within the washing tunnel.

3. The cleaning apparatus according to claim 1, wherein the second conveyor means are disposed within the washing tunnel.

4. The cleaning apparatus according to claim 1, wherein the first conveyor means pass a secondary flushing device configured to flush the sensor capsule with seawater.

5. The cleaning apparatus according to claim 1, wherein the second conveyor means pass a secondary flushing device configured to flush the node casing with seawater.

6. The cleaning apparatus according to claim 1, further comprising a drying tunnel disposed downstream from the washing tunnel, wherein the drying tunnel comprises gas nozzles fed from an accumulator.

7. The cleaning apparatus according to claim 6, wherein the first conveyor means are disposed within the drying tunnel.

8. The cleaning apparatus according to claim 6, wherein the second conveyor means are disposed within the drying tunnel.

9. The cleaning apparatus according to claim 6, further comprising a stacking device configured to stack the sensor capsules in a rectangular cassette with the longitudinal axes of the sensor capsules perpendicular to the rectangular plane spanned by the sides of the cassette.

10. The cleaning apparatus according to claim 9, wherein the stacking device is arranged between the loading/unloading apparatus and the washing tunnel.

11. The cleaning apparatus according to claim 1, further comprising a drain pipe extending from the bottom of the washing tunnel to a discharge pipe extending to a region outboard of the seismic survey vessel.

12. The cleaning apparatus according to claim 11, further comprising a supply pipe extending from the drain pipe to the waterfeed pipe; and a control module configured to operate valves to discharge wastewater through the discharge pipe and replace the discharged wastewater with freshwater from the freshwater tank whenever the salinity in the wastewater in the drain pipe exceeds a predetermined threshold value.

13. The cleaning apparatus according to claim 1, further comprising a water heater on the waterfeed pipe.

14. The cleaning apparatus according to claim 13, wherein the water heater comprises a heat exchanger configured to convey heat from wastewater to the water supplied to the water nozzles.

15. The cleaning apparatus according to claim 1, further comprising a gas heater on a gasfeed pipe comprising the gas nozzles.

16. The cleaning apparatus according to claim 15, wherein the gas heater comprises a heat exchanger configured to convey heat from wastewater to the gas supplied to the gas nozzles.

17. A method for cleaning an ocean bottom cable including a plurality of node casings interconnected by stress elements, each node casing comprising at least one sensor capsule, the method comprising the step of conveying the sensor capsules and the ocean bottom cable through a cleaning apparatus of claim 1 either both in a downstream direction or both in an opposite direction.

18. The method according to claim 17, further comprising a step of applying an anti-fouling agent to the ocean bottom cable and/or the sensor capsules.

* * * * *